United States Patent [19]

Suh et al.

[11] Patent Number: 5,275,875
[45] Date of Patent: Jan. 4, 1994

[54] BATTING THERMAL INSULATION WITH FIRE RESISTANT PROPERTIES

[75] Inventors: Kyung W. Suh, Granville; William G. Stobby, Johnstown, both of Ohio; Burton D. Brubaker, Midland, Mich.; Francis P. McCullough, Lake Jackson; R. Vernon Snelgrove, Damon, both of Tex.

[73] Assignee: The Dow Chemical Company, Midland, Mich.

[21] Appl. No.: 997,825

[22] Filed: Dec. 29, 1992

Related U.S. Application Data

[60] Division of Ser. No. 569,678, Aug. 20, 1990, Pat. No. 5,188,896, which is a continuation-in-part of Ser. No. 554,778, Jul. 19, 1990, Pat. No. 5,188,893.

[51] Int. Cl.$^5$ .............................. B32B 9/00; D02G 3/00
[52] U.S. Cl. .................................. 428/292; 428/221; 428/222; 428/224; 428/293; 428/357; 428/362; 428/364; 428/367; 428/369; 428/371; 428/372; 428/373; 428/408
[58] Field of Search ............... 428/367, 398, 292, 221, 428/222, 224, 243, 357, 362, 364, 369, 371, 372, 323, 408; 210/500.22

[56] References Cited

U.S. PATENT DOCUMENTS 4,882,223 11/1989 Aptel et al. .......................... 428/398
4,950,533 8/1990 McCulbough Jr. et al. ....... 428/362

Primary Examiner—Patrick J. Ryan
Assistant Examiner—Richard P. Weisberger

[57] ABSTRACT

A fibrous thermal insulation comprising an intimate blend of A) an effective amount of non-graphitic carbonaceous fibers having an LOI value greater than 40, a percent char value greater than 65, and a thermal conductivity less than 1 BTU hr ft$^2$/°F. for providing a synergistic improvement in fire resistance, and B) hollow thermoplastic fibers.

4 Claims, No Drawings

BATTING THERMAL INSULATION WITH FIRE RESISTANT PROPERTIES

RELATED APPLICATION

This is a divisional application of Ser. No. 569,678, filed Aug. 20, 1990, now U.S. Pat. No. 5,188,896, which is a continuation-in-part of application Ser. No. 554,778, filed Jul. 19, 1990 now U.S. Pat. No. 5,188,893 of Suh et al, entitled, "Stabilized and Carbonaceous Expanded Fibers".

FIELD OF THE INVENTION

The present invention relates to lightweight structures that have a high degree of thermal insulation, are non-wetting and/or buoyant and have good fire resistance. More particularly, the invention provides a lightweight insulation through the use of hollow fibers of thermoplastic material, particularly styrenic fibers, intimately blended with other fibers and materials, such as carbonaceous polymeric fibers, which can provide synergistic ignition and fire resistance.

BACKGROUND OF THE INVENTION

It is desirous to have lightweight structures that have a high degree of thermal insulation that can be washed and dried without retention of a great amount of water. Fiberglass containing structures are presently being used to provide fiber battings for use in insulating spaces in buildings and airplanes. In addition, fiberglass battings are being used as insulation in industrial apparel, blankets and curtains.

The problems with fiberglass is that it is difficult to handle and can cause dermal invitation. Moreover, fiberglass does not have a high insulation compact value and can pick up moisture so as to cause it to settle down after installation with a loss in insulation value.

Styrenic fibers are well-known. Moreover, styrenic fibers are low in cost, are non-irritating, have good insulation value and can be blended with other fibers utilizing conventional processes. The main disadvantage of styrenic fibers is that they are highly flammable. Hollow styrenic fibers are even more flammable because they provide a greater surface area for combustion.

Hollow fibers can also be prepared from other thermoplastic materials which have better fire resistant characteristics than styrene. However, the fire resistance of these thermoplastic materials also decreases when formulated into hollow fibers.

It is now known that carbonaceous fibers can provide a synergistic improvement in fire resistance when blended with flammable materials.

U.S. Pat. No. 4,837,076, to McCullough, Jr. et al, which is herein incorporated by reference, relates to the preparation of non-linear carbonaceous polymeric fibers and to carbonaceous polymeric fibers having different electroconductivity. This patent discloses a process which can be used to heat treat and carbonize expanded polymeric fibers to yield the fibers of the invention.

U.S. Pat. No. 4,898,783, to McCullough Jr. et al, which is herein incorporated by reference, discloses the synergism found with a blend of solid carbonaceous polymeric fibers and solid thermoplastic fibers.

U.S. Pat. No. 4,752,514, to Windley, which is herein incorporated by reference, discloses crimped and expanded polyamide fibers. The crimps in the fiber are caused by collapsed portions. There is also disclosed a process for preparing precursor fibers useful in the present invention.

U.S. Pat. No. 4,877,093, to Murata et al, which is herein incorporated by reference, discloses porous expanded acrylonitrile based fibers and a process for their preparation. The process can be used for preparing one of the precursor fibers of the invention.

U.S. Pat. No. 4,832,881, to Arnold Jr. et al, discloses the preparation of low density, microcellular carbon foams from polyamides, cellulose polymers, polyacrylonitrile, etc. The foams are rigid and brittle.

For the purpose of rendering various terms employed herein clear and readily understandable, the following definitions are provided hereinafter.

The term "stabilized" herein applies to fibers which have been oxidized at a specific temperature, typically less than about 250° C. for acrylic fibers. It will be understood that in some instances the fibers are oxidized by chemical oxidants at lower temperatures. The procedure is more clearly described in U.S. Pat. No. 4,837,076, which is herein incorporated by reference.

The term "reversible deflection" as used herein applies to a helical or sinusoidal compression spring. Particular reference is made to the publication, "Mechanical Design—Theory and Practice," MacMillan Publishing Co., 1975, pp 748, particularly Section 14-2, pp 721 to 724 as well as the herein before mentioned European published Application serial number 0199567.

The term "polymer" or "polymeric material" used herein applies to organic polymers as defined in Hawley's Condensed Chemical Dictionary, Eleventh Edition, Published by Van Nostrand Rheinhold Company. The organic polymers generally include: 1) natural polymers, such as cellulose, and the like; 2) synthetic polymers, such as thermoplastic or thermosetting elastomers; and 3) semisynthetic cellulosics. Polymers included herein are also low melting polymeric binders as well as polymeric fibers.

The term "carbonaceous fibers" as used herein is intended to include linear or nonlinear carbonaceous fibers, or mixtures of such fibers.

The term "carbonaceous fiber structure" as used herein relates to polymeric fibers whose carbon content has been irreversibly increased as a result of a chemical reaction such as a heat treatment, as disclosed in U.S. Pat. No. 4,837,076, and is at least 65%.

The term "nongraphitic" as used herein relates to those carbonaceous materials which are substantially free or oriented carbon or graphite microcrystals of a three dimensional order, typically have an elemental carbon content less than 98% and as further defined in U.S. Pat. No. 4,005,183.

The term "ignition resistant" as used herein generally applies to any one of the characteristics that are referred to as flame arresting, flame retarding, fire shielding and fire barrier, as defined in 14 CFR 25.853(b).

An article is considered to be "flame retarding" to the extent that once an igniting flame has ceased to contact unburned parts of a textile article, the article has the inherent ability to resist further propagation of the flame along its unburned portion, thereby stopping the internal burning process. Recognized tests to determine whether an article is flame retarding are, inter alia, the American Association of Textile Chemists and Colorist Test Method 34-1966 and the National Bureau of Standards described in DOC FF 3-71.

An article is considered to be "flame arresting" if it has the ability to block or prevent flames from contacting unburned parts of a flammable substance at least five (5) minutes.

An article is considered to be "fire shielding" if it is capable of deflecting flames and the radiation therefrom in a similar manner as aluminum coated protective garments, which are known in the art.

Fire barriers have the characteristic of being nonflammable and flame retarding and also provide thermal insulation characteristics.

The term "polymeric" or "polymeric resin" used herein includes natural polymers as well as other organic polymeric resins including organosilicone polymers.

The nonlinear carbonaceous fibers preferably used in the invention are resilient, shape reforming and have a reversible deflection greater than about 1.2:1. It should be understood that the reversible fiber defection comprises two components, pseudoelongation and fiber elongation. Pseudoelongation results from the nonlinear configuration and/or false twist imposed on the fiber. Fiber elongation is the elongation to fiber break after the fiber has been made linear.

The carbonaceous materials that are suitably employed in the present invention have an LOI value of greater than 40 as measured according to test method ASTM D 2863-77. The method is also known as the "oxygen index" or "limiting oxygen index" (LOI) test. With this procedure the concentration of oxygen in $O_2/N_2$ mixtures is determined at which a vertically mounted specimen is ignited at its lower end and just continues to burn. The size of the specimen is 0.65×0.3 cm with a length of from 7 to 15 cm.

The LOI values of different materials are calculated according to the following equation:

$$LOI = \frac{[O_2]}{[O_2 + N_2]} \times 100$$

The carbonaceous materials of the invention are characterized as having a percentage value greater than 65 and thermal conductivity of less than 1 BTU ft/hr ft² °F. The percent char formation and thermal conductivity of various other materials are as follows:

|  | % Char | Thermal Conductivity |
|---|---|---|
| Carbonaceous particles |  |  |
| 18.6% $N_2$ | >65 | 0.1 |
| 16.0% $N_2$ | >65 | 0.2 |
| KEVLAR | 60 | <1.0 |
| KODEL 410 polyester | 10 | <1.0 |
| Polyacrylonitrile | 60 | <1.0 |
| Oxidized polyacrylonitrile | 60 | <1.0 |
| THORNEL 300* | >95 | 4.84 |
| Cotton | >30 | <1.0 |
| Rayon | <50 | <1.0 |
| Polycarbonate | 22 | <1.0 |
| Polyethylene terephthalate | 10 | <1.0 |
| Carbon particles | >90 | 2.5 |
| THORNEL P758** | >95 | 106.48 |

*Trademark of Amoco Corp., Danbury, CT, for graphite yarn
**Trademark of Amoco Corp., Danbury, CT, for graphite yarn derived from pitch.

The measurement of char formation as illustrated in the aforementioned table and as discussed herein is made by using a standard thermogravimetric analysis apparatus that is adapted to perform the analysis in a nitrogen atmosphere. The apparatus is described in *Encyclopedia of Polymer Science*, Vol. 14, p. 21, John Wiley & Son, 1971.

The measurement is performed by loading a sample onto a sample pan of the thermogravimetric analysis apparatus. The sample is then heated in an nitrogen atmosphere at a rate of 10° C./min from ambient temperature to 900° C. The thermogravimetric apparatus records the sample weight remaining versus temperature. The percent of original weight remaining at 800° C. is taken as the char percentage.

SUMMARY OF THE INVENTION

The present invention provides a lightweight thermal insulation having a high degree of thermal resistance which comprises an intimate blend of a) an effective amount of non-graphitic carbonaceous polymeric fibers for providing ignition fire resistance, and b) hollow thermoplastic fibers. The structure advantageously comprises about 20 to 75 percent (%) by weight of the carbonaceous fiber blended with the hollow thermoplastic fibers. The carbonaceous fibers used in the invention advantageous are characterized by having a percentage char value greater than 65 and a thermal conductivity of less than about 1 BTU ft/hr ft² °F.

The carbonaceous fibers may themselves be solid, hollow, porous, linear or non-linear in configuration.

The hollow fibers used in the invention preferably are crazed or cracked for improved insulation value. Also, cracked hollow styrenic fibers provide the structure a layer volume coverage at lower weight.

The invention also provides a new process for preparing crazed or cracked hollow thermoplastic fibers, particularly styrenic fibers, having improved insulation values characterized by drawing and aspirating or fibrillating the hollow fibers during preparation.

The cracked or crazed hollow fibers of the invention are believed to be characterized by the following equation:

$$W = D_o \sin \frac{180}{n} \mu m$$

wherein
W is the width of the fiber;
$D_0$ is the outside diameter of the fiber, and
n is the number of crazes or cracks,
whereby when for a given $D_0=30$ μm
n=4, W is 21.4 μm;
n=6, W is 15 μm;
n=12, W is 7.8 μm.

It has been found that the larger the number of crazes or cracks, the smaller the fiber width and a reduction in K-factor.

DESCRIPTION OF THE PREFERRED EMBODIMENTS

In accordance with one embodiment of the invention there is provided a lightweight batting having a high degree of thermal insulation and good fire resistance by blending (A) about 20 to 75% by weight, preferably 20 to 50% by weight of non-graphitic carbonaceous fibers having an LOI value of greater than 40, a char percentage greater than 65 and a thermal conductivity of less than 1 BTU ft/hr ft² °F., and (B) hollow thermoplastic fibers, preferably, styrenic fibers. Higher amounts of the carbonaceous fibers are preferred with the more flammable thermoplastic fibers. A preferred minimum amount of carbonaceous fibers is that which provides a synergistic amount of fire resistance so that the insulation passes the requirements of 14 FAR 25.853(b) for non-flammability. The combination also have improved ignition resistance.

Preferred hollow fibers are those having a fiber width of about 6 $\mu$m to 30 $\mu$m and at least 6 cracks or crazes, preferably about 12.

In accordance with another embodiment, the structure of the invention can comprise a lightweight structural panel of a compression formed composite of a thermoplastic or thermosetting resin matrix containing from 10 to 95 percent by weight of the fibrous blend of the invention. The panel can be used alone or in combination with a nonflammable reinforcement scrim comprising, for example, a woven, nonwoven, or knitted fabric, web, foam or a metallic screen or glass screen.

The structures of the present invention provide an improvement over fiberglass structures which utilize phenolic binders. The improvement includes an advantage in weight as well as in smoke characteristics.

Thermoplastic reins which can be used to form the hollow fibers of the invention, for example, may include polyethylene, ethylene vinyl acetate copolymers, polystyrene, polyvinyl chloride, polyvinyl acetate, polymethacrylate, acrylonitrile-butadiene-styrene copolymers (ABS), polyphenylene oxide (PPO), a halo group modified PPO, polycarbonate, polyacetal, polyamide, polysulfone, polyether sulfone, polyolefins, polyacrylonitrile, polyvinylidene chloride, polyvinyl acetate, polyvinyl alcohol, polyvinyl pyrrolidone, ethyl cellulose, polyvinyl chlorodivinyl acetate copolymer, polyacrylonitrile-styrene copolymer, polyacrylonitrile-vinyl chloride copolymer, styrene, carboxymethylcellulose, polyparaxylene, polyimide, polyamide-imide, polyester imide, polyetherimide, polybenzimidazole, polyoxadiazole, and the like.

Other suitable thermoplastic materials are disclosed in *Modern Plastic Encyclopedia*, 1984–1985, Vol. 61, No. 10A, McGraw-Hill, New York, N.Y.

The thermoplastic resins used to form the hollow fibers of the invention may contain plasticizer (mineral oil, dioctyl phthalate, etc.), flame retardant (hexabromocyclododecane, decabromodiphenyl oxide, alumina trihydrate, etc.), acid scavengers (MgO, etc.), and extrusion aid or lubricant (calcium stearate, etc.).

The hollow fibers of the invention can be in any form. The fibers can be fibrillated or aspirated hollow fibers, stretched hollow fibers or curly hollow fibers.

A first group of carbonaceous fibers that can be used in the invention are classified as being electrically nonconductive and to possess no anti-static characteristics, i.e., they do not have the ability to dissipate an electrostatic charge.

The term "electrically nonconductive" as utilized in the present invention relates to fibers having an electrical resistance of greater than $4 \times 10^6$ ohms/cm when measured on a 6K tow (6000 filaments) formed from precursor fibers having a diameter of from 4 to 25 microns. Such fibers have a specific resistivity of greater than $10^{-1}$ ohms cm. The specific resistivity is calculated from measurements as descrived in the published European Patent Application Serial number 0199567.

When the precursor fiber is an acrylic fiber it has been found that a nitrogen content of greater than 18 percent results in a nonconductive fiber.

In a second group, the carbonaceous fibers are classified as being partially electrically conductive (i.e., having low conductivity) and having a carbon content of less than 85 percent. Low conductivity means that the fibers have a resistance of from $4 \times 10^2$ to $4 \times 10^6$ ohms/cm, as determined by the measurements hereinbefore specified. Preferably, the carbonaceous fibers are derived from stabilized acrylic fibers and possess a percentage nitrogen content of from 16 to 20 percent for the case of a copolymer acrylic fiber, more preferably from 18 to 20 percent. The structures formed therefrom are lightweight, have low moisture absorbency, good abrasive strength together with good appearance and handle.

The principles, preferred embodiments and modes of operation of the present invention have been described in the foregoing specification. The invention which is intended to be protected herein, however, is not to be construed as limited to the particular forms disclosed, since these are to be regarded as illustrative rater than restrictive. Variations and changes may be made by those skilled in the art without departing from the spirit of the invention.

EXAMPLE 1

Following the procedure of U.S. Pat. No. 4,882,223, which is herein incorporated by reference, polystyrene with a 300,000 weight average molecular weight was introduced into a $\frac{3}{4}''$ extruder. The polymer was melted at about 450° F. and passed through a Zenith gear pump at about 475° F. The molten polymer was pumped to the pack well and then to a pack assembly consisting of a screen and spinneret with low pressure air passing through the inner hole to produce a hollow fiber. The spinneret had a temperature of 392° F. and an operating pressure of 400 psi. The fiber was then passed through draw rolls and was wound around Leesona take-up rolls with an aspirator device at 400 ft/min.

The aspirator was normally used to "suck" off the fibers while a full roll was taken off and an empty roll loaded on. Some of the fibers were collected by passing through the aspirator and into a plastic bag. In entering the aspirator, the fibers went around a fairly sharp right angle bend. Once entering into the air stream of the aspirator, the fiber appeared to go through a twisting motion. The fibers were cottony soft and somewhat like a loose threads instead of brittle fibers produced without passing it through the aspirator. The individual fibers had a 25~30 $\mu$m outside diameter with a wall thickness of 2-5 $\mu$m. The aspirated fibers has crazes or cracks along the axial direction of the hollow fibers probably due to the twisting motion of individual fibers when passing through the aspirator.

EXAMPLE 2

The hollow fibers of Example 1 where then hand cut into two inch length and hand blended with carbonaceous fibers and polyester binder fibers. After hand blending, the fiber blend was fed into a Rando Mizer Card to further blend and open the fibers. The Rando Mizer Product was processed into a non-woven batting on a Rando-B machine. The batting was thermobonded at 225° F. for 60 seconds.

Table 1 shows the K-factors as a function of density and carbonaceous fiber concentration. As a comparison, the fiberglass batt with a density of 0.65 pcf has a K-factor of 0.315.

TABLE 1

K-FACTORS OF FIBER BLEND BATTS

| NCF/Hollow Polymer Fiber Batt | Density (pcf) | K-Factor BTU in/hr ft² °F. |
|---|---|---|
| Sample 1 | | |
| 30% NCF* | 0.57 | 0.311 |
| 20% Polyester binder | 0.85 | 0.270 |
| 50% Polystyrene hollow fiber | 1.70 | 0.231 |
| Sample 2 | | |
| 20% NCF* | 0.62 | 0.302 |
| 20% Polyester binder | 0.83 | 0.275 |
| 60% Polystyrene hollow fiber | 1.24 | 0.248 |
| Sample 3 | | |
| 12% NCF* | 0.52 | 0.353 |
| 20% Polyester binder | 0.78 | 0.304 |
| 68% Polystyrene hollow fiber | 1.56 | 0.246 |
| Sample 4 | | |
| 30% NCF* | 0.45 | 0.321 |
| 20% Polyester binder | 0.68 | 0.276 |
| 50% Nylon 8207 hollow fiber | 1.35 | 0.233 |
| Sample 5 | | |
| 20% NCF* | 0.52 | 0.335 |
| 20% Polyester binder | 0.69 | 0.299 |
| 60% Nylon 8207F | 1.04 | 0.262 |
| Sample 6 | | |
| 10% NCF* | 0.79 | 0.309 |
| 20% Polyester binder | 1.05 | 0.283 |
| 70% Nylon 8207F | 1.57 | 0.255 |
| Sample 7 | | |
| 30% NCF* | 0.70 | 0.298 |
| 20% Polyester binder | 0.94 | 0.271 |
| 50% PET recycle | 1.41 | 0.245 |
| Sample 8 | | |
| 77% NCF* | 3.193 | 0.208 |
| 23% Polyester binder | 5.602 | 0.209 |
| Sample 9 | | |
| 20% NCF* | 0.359 | .401 |
| 10% Kodel 410 Polyester (2.25d) | 0.539 | .335 |
| 10% Kodel 410 Polyester (8.5d) | 1.078 | .264 |
| 60% Dacron 435 (5.5d) | 2.995 | .230 |
| Sample 10 | | |
| 20% NCF* | 0.82 | 0.315 |
| 20% Polyester binder | 1.09 | 0.287 |
| 60% PET recycle | 1.64 | 0.256 |
| Sample 11 | | |
| Fiberglass | 0.65 | 0.315 |
| Example 12 | | |
| Polystyrene fiber | 1.0 | 0.337 |
| Sample 13 | | |
| Aspirated polystyrene | 1.0 | 0.256 |
| Hollow fiber | 0.5 | 0.277 |

*Non-linear non-electrically conductive carbonaceous fibers derived from polyacrylonitrile.

EXAMPLE 3

A general purpose, fiber grade polypropylene (NPP2000-GJ produced by Northern Petrochemical Co.) with a melt index of 2.0 was extruded at 600° F. to produce hollow fibers as in Example 1. The individual hollow fiber had a 28 μm O.D.×22 μm I.D. The aspirated hollow fibers were also stretched to reduce the diameter and to add curl for bulking and the K-factors are compared in Table 2.

TABLE 2

| Fibers | Density (pcf) | K (BTU in/hr ft² °F.) |
|---|---|---|
| Aspirated polypropylene | 1.5 | 0.237 |
| Hollow fibers | 1.0 | 0.259 |
| | 0.51 | 0.320 |
| | 0.26 | 0.414 |
| Hand stretched aspirated polypropylene fibers | 0.25 | 0.371 |

EXAMPLE 4

Special acrylic fiber (SAF) from Cautaulds Ltd. was dissolved in N-methyl pyrrolidone to obtain a 15–45 vol. % solution. The polymer was then spun at a temperature between 160° to 200° C. using a 16 hole fiber spinneret and nitrogen as a core gas. The spun hollow fibers were then quenched in a water bath at about 10° C. for about 2 seconds to coagulate or phase separate the denser polymer at the surface of hollow fibers squeezing more solvent toward the inner surface. These hollow fibers were then passed through a water bath at about 30° C. to leach out the solvent and to obtain an asymmetric porous structure with greater porosity toward the inside of the hollow fibers (200μOD/20-μID). These asymmetric porous hollow fibers were dried and then heat treated in a forced air oven at 200° C. for 30 minutes to promote the oxidation and crosslinking reactions of the SAF. This was followed by a heat treatment in an inert atmosphere of nitrogen at 500° C. until an 85% loss of initial polymer sample weight is achieved. The result is an asymmetric porous carbonaceous fiber.

In lieu of N-methyl pyrrolidone there may be utilized as a solvent sulfolane, dimethylformamide, polyethylene glycol, polyethylene glycerol or mixtures thereof, for example, 25% polyethylene glycol/75% sulfolane.

In lieu of SAF there may be utilized polyacrylonitrile or its copolymers.

EXAMPLE 5

Nonflammability Test

The nonflammability of the various blend of the invention were determined following the test procedure set forth in 14 CFR 25.853(b). The tests were performed as follows:

A minimum of three 2.5 cm×15 cm×30 cm specimens of each blend were conditioned by maintaining the specimens in a conditioning room maintained at temperature of 21° C. ±5° and 50 percent ±5 percent relative humidity for 24 hours preceding the test.

Each specimen was supported vertically and exposed to a Bunsen or Turill burner with a nominal I.D. tube adjusted to give a flame of 3.8 cm in height. The minimum flame temperature measured by a calibrated thermocoupled pyrometer in the center of the flame was 843° c. The lower edge of the specimen was 1.9 cm above the top edge of the burner. The flame was applied to the center line of the lower edge of the specimen for 12 seconds and then removed. The results of the test is shown in Table 3.

TABLE 3

FLAMMABILITY TEST ACCORDING TO FAR.25.853

| Sample No. | Sample Composition | Burn Length (in) | Flame Time (sec) | Drip Time (sec) | Pass or Fail |
|---|---|---|---|---|---|
| 1 | 30% NCF* 20% Polyester 50% Polystyrene hollow fiber | 3 | <5 | 0 | Pass |
| 2 | 20% NCF* 20% Polyester | 5.5 | <15 | 0 | Pass |

TABLE 3-continued

FLAMMABILITY TEST ACCORDING TO FAR.25.853

| Sample No. | Sample Composition | Burn Length (in) | Flame Time (sec) | Drip Time (sec) | Pass or Fail |
|---|---|---|---|---|---|
|   | 60% Polystyrene hollow fiber |   |   |   |   |
| 3 | 12% NCF* 20% Polyester 68% Polystyrene hollow fiber | 10.0 | 25 | 0 | Fail |
| 4 | 30% NCF* 20% Polyester 50% Nylon 8207F hollow fiber | 1.5 | <5 | 0 | pass |
| 5 | 20% NCF* 20% polyester 60% Nylon 8207F hollow fiber | 2.0 | <5 | 0 | Pass |
| 6 | 10% NCF* 20% Polyester 70% Nylon 8207F hollow fiber | 3.0 | <5 | 0 | Pass |
| 7 | 30% NCF* 20% Polyester 50% PET** recycled hollow fiber | 1.5 | <10 | 0 | Pass |
| 8 | 20% NCF* 20% Polyester 60% PET** recycled hollow fiber | 1.0 | 0 | 0 | Pass |

*Non-linear non-electrically conductive carbonaceous fibers derived from polyacrylonitrile.
**Polyethylene terephthalate
Polyester: Celanese Polyester 353 binder (4 denier)
Polyester: 300,000 Molecular weight

EXAMPLE 6

Preparation of Crimped Expanded Carbonaceous Fibers

A copolymer comprising 95% acrylonitrile and 5% vinyl chloride was dissolved in acetone. To this copolymer solution, 40% of 1,1,2-trichloro-1,2,2-trifluoroethane and 0.2% titanium dioxide were added to have the final polymer concentration adjusted to 35%; and the solution was stirred at 40° C. to yield a spinning solution. This solution was then discharged into a 20% aqueous solution of acetone at 35° through a spinneret with 10000.10 mm $\phi$ slits. After immersion therein for 9 seconds at a take-up rate of 4.5 m/min., the spun mix was immersed for 6 sec. in a 25% aqueous acetone solution at 30° C. while drawing it 1.8 times, and thereafter, crimped and heat treated at 525° C. without any tension or stress in an apparatus described in application Ser. No. 340,098. The fiber when carbonaceous had low electrical conductivity, an expansion of about 10%, a reversible deflection ratio greater than 2:1 and an LOI greater than 40.

To prepare the linear fibers, the crimping step may be omitted. Similarly, there may be prepared expanded carbonized polybenzimidazole fibers.

EXAMPLE 7

Expanded KEVLAR polyamide continuous 3K tow was prepared according to U.S. Pat. No. 4,752,514 having nominal single fiber diameters of 15 micrometer. The tow was knit on a circular knitting machine into a cloth having from 3 to 4 loops per centimeter. The cloth was heat set at 525° C. for two minutes. When the cloth was deknitted, it produced a tow which had an elongation or reversible deflection ratio of greater than 2:1. The deknitted tow was cut into various lengths of from 5 to 25 cm, and fed into a Platt Shirley Analyzer. The fibers of the tow were separated by a carding treatment. The fibers can be blended with hollow styrenic fibers to produce a light weight insulation.

EXAMPLE 8

A 3K tow of expanded p-aramid was knit on a circular knitting machine at a rate of 4 stitches/cm and was then heat treated at a temperature of 425° C. without stabilizing for ten minutes. The cloth was deknitted and the two (which had an elongation or reversible deflection ratio of greater than 2:1) was cut into 7.5 cm lengths. The cut tow was then carded on a Platt miniature carding machine together with the fibers of Example 1 to produce a resilient compressible fluff.

The fluff can be densified by needle punching, treated with thermoplastic binder such as a polyester binder, or the like, to form a mat or felt-like structure.

EXAMPLE 9

Following the procedure of Example 1, the following hollow fibers with about 6–12 cracks were prepared:

| Polymer | Spinneret Temp. (°C.) | Spinneret Pressure (psi) | Take-up Speed (ft/min) | Fiber ID (micron) | Wall Thickness (micron) |
|---|---|---|---|---|---|
| Polystyrene | 290~295 | 380~440 | 320~500 | 45~55 | 5~7 |
| Nylon 8207F | 310 | 970 | 500~1000 | 35~50 | 4~8 |
| PET Recycle | 270 | 370 | 500 | 30~40 | 7~9 |
| Polypropylene | 321 | 460~500 | 350 | 65 | 5 |
| PETG | 290 | 340~490 | 500 | 45~50 | 4~5 |
| Polyester | 360 | 420 | 140~176 | 75 | 10 |

Polystyrene: Dow Chemical Company
Nylon 807F: Allied-Signal
PET Recycle: Star Plastics
Polypropylene: Norchem PP 7300KF
PETG: Eastman Kodak
PE 529: Dow Chemical Company

What is claimed:

1. A structural panel of a compression formed composite comprising a thermoplastic or thermosetting resin and from about 10 to 95 percent by weight of an intimate blend of A) 20 to 75% by weight of non-electrically conductive carbonaceous fibers derived from oxidized polyacrylonitrile fibers and B) hollow styrenic fibers having about 6 to 12 crazes along the axial direction of the fibers, said carbonaceous fibers having an LOI value greater than 40, a percent char value greater than 65, a carbon content of less than 85 percent and a thermal conductivity less than 1 BTU ft/hr ft$^2$ °F.

2. The structural panel of claim 1, wherein said carbonaceous fibers are derived from a stabilized expanded acrylic fiber selected from acrylonitrile homopolymers, acrylonitrile copolymers and acrylonitrile terpolymers, wherein aid copolymers and terpolymers contain at least 85 mole percent acrylic units.

3. The structural panel of claim 1, wherein said carbonaceous fibers have a carbon content of less than 85 percent.

4. The structural panel of claim 1, wherein the carbonaceous fibers are a mixture of linear and non-linear expanded carbonaceous fibers.

* * * * *